(12) United States Patent
Liu et al.

(10) Patent No.: US 10,756,820 B2
(45) Date of Patent: Aug. 25, 2020

(54) PHASE ANALOG COHERENT DEMODULATION SYSTEM AND METHOD FOR PHASE SENSITIVE OPTICAL TIME DOMAIN REFLECTOMETRY

(71) Applicant: Zhejiang Jericore Technologies Co., LTD., Quzhou, Zhejiang Province (CN)

(72) Inventors: Hangjie Liu, Ningbo (CN); Yimin Xie, Shenzhen (CN); Yibo Hu, Ningbo (CN)

(73) Assignee: ZHEJIANG JERICORE TECHNOLOGIES CO., LTD., Quzhou, Zhejiang Province (CN)

( * ) Notice: Subject to any disclaimer, the term of this patent is extended or adjusted under 35 U.S.C. 154(b) by 0 days.

(21) Appl. No.: 16/518,984

(22) Filed: Jul. 22, 2019

(65) Prior Publication Data

US 2020/0021365 A1 Jan. 16, 2020

(30) Foreign Application Priority Data

May 21, 2018 (CN) .......................... 2018 1 0489209

(51) Int. Cl.
*H04B 10/071* (2013.01)
*H04B 10/548* (2013.01)
(Continued)

(52) U.S. Cl.
CPC ......... *H04B 10/548* (2013.01); *H04B 10/071* (2013.01); *H04L 27/22* (2013.01); *H04L 27/364* (2013.01)

(58) Field of Classification Search
CPC .................................................. H04B 10/071
See application file for complete search history.

(56) References Cited

U.S. PATENT DOCUMENTS

2013/0113629 A1* 5/2013 Hartog ............... G01D 5/35303
340/853.2
2015/0349486 A1* 12/2015 Ou ........................... H01S 3/30
372/70
(Continued)

FOREIGN PATENT DOCUMENTS

CN 102628698 A 8/2012
CN 104819770 A 8/2015
(Continued)

OTHER PUBLICATIONS

Lu et al., "High spatial resolution phase-sensitive optical time domain reflectometer with a frequency-swept pulse," Opt. Lett. 42, 391-394 (2017) (Year: 2017).*

*Primary Examiner* — Nathan M Cors
(74) *Attorney, Agent, or Firm* — Cheng-Ju Chiang (57) ABSTRACT

A phase analog coherent demodulation system includes a difference frequency and pulse generator configured to generate a pulsed light and a continuous light with different frequency from the pulsed light, a controller, and an I/Q demodulation module. The controller locks the frequency difference signal of the pulse light, and the pulsed light generates the backward scattered light of constant frequency in the measured medium, and the backward scattered light returns along the original path and mixing beat with the continuous light in the I/Q demodulation module, the difference frequency electrical signals of the two optical signals are obtained. The I/Q demodulation module orthogonally demodulates the difference frequency electrical signal by using the frequency difference signal of the pulsed light and the continuous light as the fundamental frequency signal of the orthogonal demodulation, to detect phase information (Continued)

of the vibration signal. The invention reduces the operating frequency required for quadrature demodulation in system phase detection.

10 Claims, 4 Drawing Sheets

(51) Int. Cl.
*H04L 27/22* (2006.01)
*H04L 27/36* (2006.01)

(56) References Cited

U.S. PATENT DOCUMENTS

2016/0191163 A1* 6/2016 Preston ............... G01B 11/161
    398/16
2019/0025094 A1* 1/2019 Lewis .................. G01H 9/004

FOREIGN PATENT DOCUMENTS

| CN | 105509868 A | 4/2016 |
| CN | 106500742 A | 3/2017 |

\* cited by examiner

FIG. 5

PHASE ANALOG COHERENT DEMODULATION SYSTEM AND METHOD FOR PHASE SENSITIVE OPTICAL TIME DOMAIN REFLECTOMETRY

CROSS REFERENCE TO RELATED APPLICATIONS

This non-provisional patent application claims priority under 35 U.S.C. § 119 from Patent Application No. 201810489209.7 filed in The People's Republic of China on May 21, 2018.

FIELD OF THE INVENTION

The disclosure relates to distributed optical fiber vibration sensors, and more particularly to a phase analog coherent demodulation system and method for a phase sensitive optical time domain reflectometry.

BACKGROUND OF THE INVENTION

Phase sensitive optical time domain reflectometry (φ-OTDR) enables vibration monitoring along the sensing optical fiber by injecting high-coherence narrow-line wide pulse light into the sensing optical fiber and receiving and analyzing the backward Rayleigh scattering signal. It has the advantages of long monitoring distance, high sensitivity, low resource consumption and anti-electromagnetic interference. It plays an important role in the intrusion monitoring and detection of important security sites such as military bases, petrochemical plants, nuclear power plants, airports, subways and prisons.

Vibration signal demodulation is a key technology in φ-OTDR. Nowadays, the vibration signal demodulation methods of φ-OTDR system generally include backward scattered light intensity detection technology and backward scattered light phase detection technology. The backward scattered light intensity detection technology is simple and easy to implement, but is subject to the polarization of scattered light, noise of State system and other factors, and only qualitative detection of vibration signals can be realized. High-precision detection must be realized by backward scattered light phase detection technology. Moreover, according to the theory of φ-OTDR, the phase change of the backward scattered light has a linear relationship with the external vibration signal, so that the accurate measurement of the vibration signal can be realized by detecting the phase information of the backward scattered light.

Coherent demodulation method is a common method for phase detection of backward scattered light in φ-OTDR system. Patent "Distributed Optical Fiber Sensor and Information Demodulation Method" (Application No. 201210099835.8), patent "Phase Sensitive Optical Time Domain Reflecting Optical Fiber Distributed Sensor System Phase Calculation Method" (CN201510941643), and the patent "phase optical time domain reflectometry device and method based on heterodyne detection and phase demodulation" (CN201510245870) all propose to use digital coherent detection technology to receive Rayleigh signal of phase sensitive light time domain reflectometry, thereby demodulating the phase and amplitude of the Rayleigh signal, enabling simultaneous detection of the position, frequency and intensity of the disturbance information. However, digital coherent detection technology requires high-speed data acquisition and processing to ensure signal integrity, which is expensive, and imposes high requirements on both hardware and software, making it difficult to implement.

The patent "a Phase sensitive optical time domain reflectometry phase demodulation system and phase demodulation method" (201611253531.7) proposes a phase demodulation system and a phase demodulation method, which adopts a mixing technique of orthogonal coherent optical signals to realize hardware coherent detection, so that the system has better noise ratio and stability. However, the frequency of mixing frequency of this system is determined by a single acousto-optic modulator (AOM). The frequency of the AOM is usually up to 100 megahertz, so it needs to be realized by using a microwave mixer with a bandwidth of up to 100 megahertz. The method does not actually reduce the processing speed of the hardware and software required by the system, and the implementation is still difficult.

SUMMARY

An object of the disclosure is to provide a phase analog coherent demodulation system and method for phase sensitive optical time domain reflectometry, which reduces the operating frequency required for quadrature demodulation in system phase detection, and reduces cost and hardware and software design difficulty. This makes quadrature demodulation easy to implement.

Another object of the disclosure is to provide a phase analog coherent demodulation system and method for phase sensitive optical time domain reflectometry, which improves the stability in the quadrature demodulation process and increases the measurement distance of the system.

In order to achieve the above object, the disclosure provides A phase analog coherent demodulation system for phase sensitive optical time domain reflectometry, which includes a difference frequency and pulse generator, a controller, an optical fiber amplifier, a three-port optical circulator with a first port, a second port, and a third port and I/Q demodulation module, the difference frequency and pulse generator is configured to generate a pulsed light and a continuous light with different frequency from the pulsed light, the controller is configured to be electrically connected to the difference frequency and pulse generator, and the controller further being configured to generate a first frequency difference signal with a frequency of range of 10 KHz~100 MHz between the pulsed light and the continuous light; the optical fiber amplifier is configured to receive the pulsed light and amplifies the optical frequency of the pulsed light; the three-port optical circulator with a first port, a second port, and a third port, and the three-port circulator is configured to receive the amplified pulsed light from the optical fiber amplifier through the first port and transmit the amplified pulsed light to the measured medium through the second port, a backward scattered light with a similar frequency with the amplified pulse light being generated when the pulse light disseminates in the measured medium, the backward scattered light being returned to the three-port optical circulator along the original path and output through the third port; the I/Q demodulation module is configured to receive the backward scattered light, the continuous light, and the first frequency difference signal, the I/Q demodulation module being further configured to mix the backward scattered light and the continuous light to generate a second frequency difference signal of the backward scattered light and the continuous light, and orthogonally demodulate the second frequency difference signal with the first frequency difference signal as a quadrature demodulated baseband signal to obtain phase information and amplitude information of the second frequency signal, the I/Q demodulation module comprises a first coupler, a 90° phase shifter, a balance detector, a first analog multiplier, and a second analog multiplier, a first low pass filter, a second low pass filter, and a data acquisition processing module, wherein the first coupler receives and mixes the continuous light and the backward scattered light and inputs the continuous light and the backward scattered light mixed to the balance detector, the balance detector processes the continuous light and the backward scattered light mixed and generate the second frequency difference signal, the 90° phase shifter receives the first frequency difference signal and inputs it into the first analog multiplier after phase shifting by 90°, the first analog multiplier multiplies the second frequency difference signal and the first frequency difference signal after 90° phase shifting, and outputs the operation result to the first low pass filter, the first low pass filter processes the operation result and outputs the first low frequency signal, the second analog multiplier directly receives the first frequency difference signal and multiplies the first frequency difference signal and the second frequency difference signal and outputs the operation result to the second low pass filter, the second low pass filter processes the operation result and outputs a second low frequency signal, the data acquisition and processing module is electrically connected to the controller, and the data acquisition processing module receives the first low frequency signal and the second low frequency signal under control by the controller, and performs divisions and anti tangent operations to obtain the phase information and the amplitude information base on the first low frequency signal and the second low frequency signal.

The difference frequency and pulse generator includes a laser, a second coupler, an electro-optic modulator, a first acousto-optic modulator, and a second acousto-optic modulator, the electro-optic modulator, the first acousto-optic modulator and the second acousto-optic modulator are respectively electrically connected to the controller the laser emits continuous light of a first frequency to the second coupler, the second coupler divides the continuous light into two beams, one of which is input to the electro-optic modulator, and the electro-optic modulator modulates the continuous light into pulses under the driving of the controller and input it to the fiber amplifier, the other way is sequentially input to the first acousto-optic modulator and the second acousto-optic modulator, the first acousto-optic modulator shifts the frequency of the continuous light up to a second frequency, the second acousto-optic modulator shifts the frequency of the continuous light downward to a third frequency input to the first coupler, the controller outputs a first frequency difference signal to the I/Q demodulation module.

The difference frequency and pulse generator includes a laser, a second coupler, a first acousto-optic modulator and a second acousto-optic modulator, wherein the first acousto-optic modulator and the second acousto-optic modulator are electrically connected to the controller, respectively, the laser emits continuous light of a first frequency to the second coupler, the second coupler divides the continuous light into two beams, one of which is input to the first acousto-optic modulator, and the first acousto-optic modulator is driven by the controller, the frequency of the continuous light is shifted up to a second frequency and modulated into pulsed light input to the fiber amplifier, the other one of which is input to the second acousto-optic modulator, the second acousto-optic modulator shifts the frequency of the continuous light up to a third frequency and input to the first coupler, the controller outputs a first frequency difference signal to the I/Q demodulation module.

The difference frequency and pulse generator includes a first laser, a second laser, a third coupler, a fourth coupler, a fifth coupler, and an electro-optical modulator, wherein the first laser emits continuous light of a first frequency to the third coupler, the third coupler divides the continuous into two beams, one of which is modulated into pulsed light by the electro-optic modulator and output to the optical fiber amplifier, and the other one of which output from the third coupler is input to the fourth coupler, the second laser emits continuous light of a second frequency to the fifth coupler, and the fifth coupler divide the continuous light into two beams, one beam of the continuous light is input to the fourth coupler, the fourth coupler mixes the continuous light having the first frequency from the third coupler with the continuous light having the second frequency, and inputs it into the controller, the other beam of the continuous light of the second frequency output by the fifth coupler is input to the first coupler, the first laser and the second laser are respectively electrically connected to the controller, and the controller outputs a first frequency difference signal of continuous lights emitted respectively by the first laser and the second laser to the I/Q demodulation module.

The measured medium is optical fiber or atmosphere.

The phase analog coherent demodulation system for phase sensitive optical time domain reflectometry further comprise a laser transceiver, the laser transceiver is connected to the second port of the three-port optical circulator.

The phase analog coherent demodulation system for phase sensitive optical time domain reflectometry further include a Raman amplification module, the Raman amplification module is disposed between the three-port optical circulator 40 and the measured medium 80, the Raman amplification module includes a third laser and a wavelength division multiplexing module, and the third laser output continuous light having a second frequency to the wavelength division multiplexing module, the wavelength division multiplexing module is connected to the second port of the three-port optical circulator.

The range of the first frequency difference signal is controlled by the controller at 10 KHz~100 MHz.

A Phase sensitive optical time domain reflectometry phase analog coherent demodulation method, which includes steps of: outputting continuous light and pulsed light of different frequencies; receiving backward scattered light generated by the pulsed light in the measured medium; locking the frequency difference of the continuous light; using the frequency difference between the continuous light and the pulsed light as a fundamental frequency of I/Q quadrature demodulation, and performing I/Q delivered demodulation on the frequency difference signal of the continuous light and the backward scattered light.

Using the frequency difference between the continuous light and the pulsed light as a fundamental frequency of I/Q quadrature demodulation, and performing I/Q delivered demodulation on the difference frequency electrical signals of the continuous light and the backward scattered light includes steps of: dividing the frequency into two paths, and phase-shifting one of them by 90°; dividing the difference frequency electrical signal of the continuous light and the pulse light into two paths for multiplication operation and low-pass filter processing respectively, and then performing division and inverse tangent operations on the processing results of the two differential frequency electrical signals.

The range of the frequency difference signal is controlled by the controller at 10 KHz~100 MHz.

In the above charging system, a plurality of mobile power sources are provided. Therefore, the mobile power supply can be provided to the user according to the charging request of the user to meet the charging request of the user, without requiring the user to place the electronic device such as the mobile phone at a designated location for charging, thereby improving Convenience and safety of charging process.

DETAILED DESCRIPTION OF THE PREFERRED EMBODIMENTS

In the following, the invention is further described with reference to the drawings and specific embodiments. It should be noted that, without conflict, any combination of the embodiments or the features may form a new embodiment.

Figure 1:
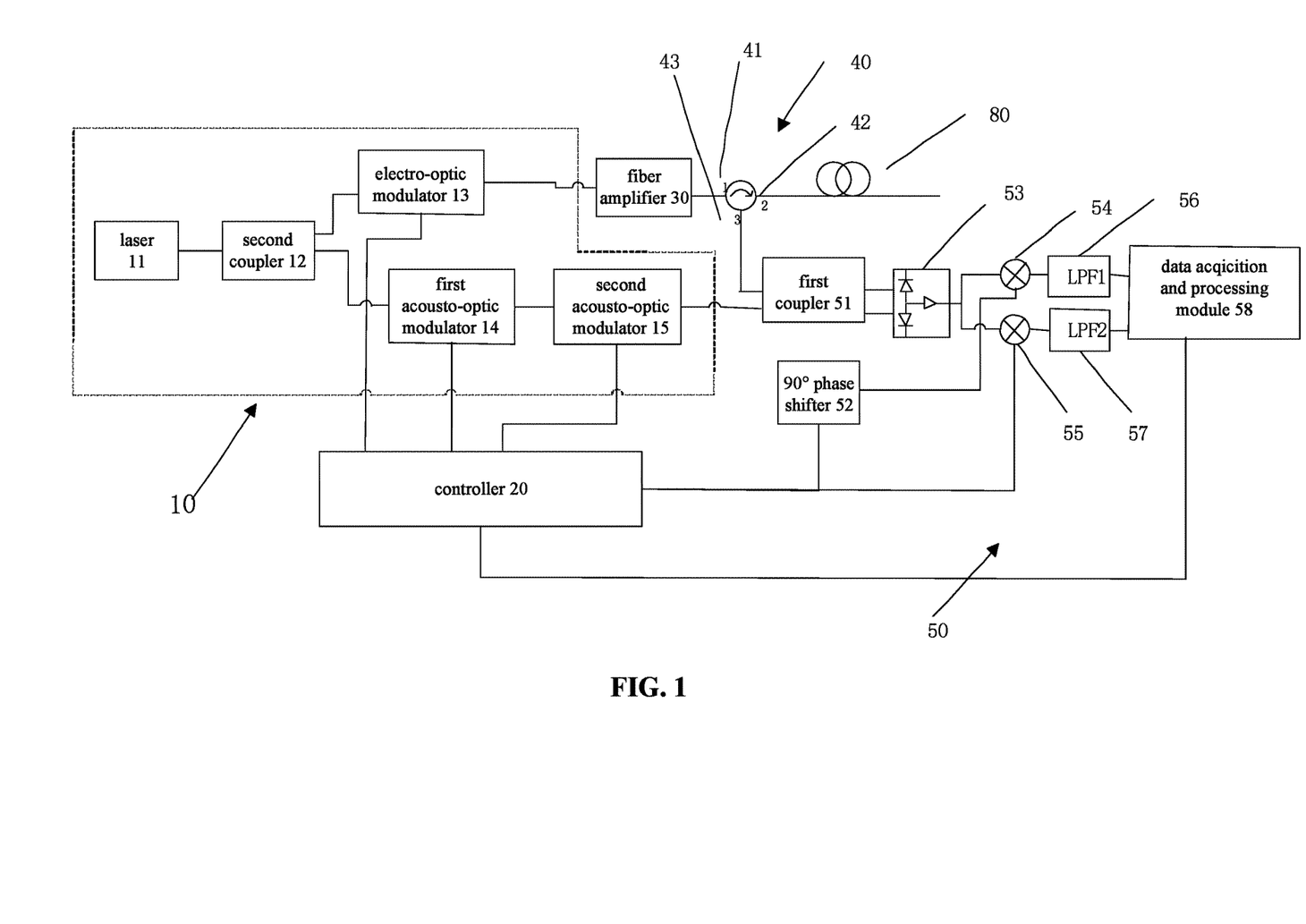
FIG. 1 illustrates a configuration diagram in accordance with an embodiment.

Referring to FIG. 1, a phase analog coherent demodulation system for phase sensitive optical time domain reflectometry in accordance with an embodiment will be illustrated in the following description. The phase analog coherent demodulation system for phase sensitive optical time domain reflectometry comprises a difference frequency and pulse generator 10, a controller 20, an optical fiber amplifier 30, a three-port optical circulator 40 and an I/Q demodulation module 50.

The difference frequency and pulse generator 10 is configured to generate two different pulses of pulsed light and continuous light.

The controller 20 is electrically connected to the difference frequency and pulse generator 10, and the controller 20 generates the frequency difference signal between the pulsed light and the continuous light.

The optical fiber amplifier 30 is configured to receive the pulsed light and amplifies the optical frequency of the pulsed light. The optical fiber amplifier 30 further transmit the amplified pulsed light into the first port 41 of the three-port optical circulator 40, and then amplified pulsed light is transmitted to the measured medium 80 through a second port 42 of the three-port optical circulator 40. A backward scattered light with a similar frequency with the pulse light is generated when the pulse light disseminates in the measured medium 80. The backward scattered light returns to the three-port optical circulator 40 along the original path and output through a third port 43 of the three-port optical circulator 40.

The I/Q demodulation module 50 includes a first coupler 51, a 90° phase shifter 52, a balance detector 53, a first analog multiplier 54, and a second analog multiplier 55, A first low pass filter 56, a second low pass filter 57, and a data acquisition processing module 58, wherein the continuous light and the backward scattered light are input to the first coupler 51.

The first coupler 51 mixes the continuous light and the backward scattered light and inputs it into the balance detector 53. The balance detector 53 processes the continuous light and the backward scattered light and outputs a difference frequency electrical signal of the two optical signals to the first analog multiplier 54 and the second analog multiplier 55. The 90° phase shifter 52 receives the frequency difference signal output from the controller 20 and inputs it into the first analog multiplier 54 after phase shifting by 90°, the first analog multiplier 54 multiplying the difference frequency electrical signal and the frequency difference signal after 90° phase shifting, and outputting the operation result to the first low pass filter 56. The first low pass filter 56 processes the operation result and outputs the first low frequency signal. The second analog multiplier 55 directly receives the frequency difference signal output from the controller 20 and multiplies the frequency difference signal and the difference frequency electrical signal and outputs the operation result to the second Low pass filter 57. The second low pass filter 57 processes the operation result and outputs a second low frequency signal.

The data acquisition and processing module 58 is electrically connected to the controller 20, and the data acquisition processing module 58 receives the first low frequency signal and the second low frequency signal and performs division according to the trigger of the controller 20, thereby detect phase information and amplitude information of the backward scattered light.

Specifically, the difference frequency and pulse generator 10 includes a laser 11, a second coupler 12, an electro-optic modulator 13, a first acousto-optic modulator 14, and a second acousto-optic modulator 15. The electro-optic modulator 13 is electrically connected to the controller 20. The laser 11 emits continuous light of a first frequency $f_0$ to the second coupler 12. The second coupler 12 splits the continuous light into two paths, one of which is input to the electro-optic modulator 13, and the electro-optic modulator 13 modulates the continuous light into pulses under the driving of the controller 20 and input it to the fiber amplifier 30. The other way is sequentially input to the first acousto-optic modulator 14 and the second acousto-optic modulator 15. The first acousto-optic modulator 14 shifts the frequency of the continuous light up to a second frequency $f_0+f_c+f_1$, the second acousto-optic modulator 15 shifts the frequency of the continuous light downward to a third frequency $f_0+f_c+f_1-f_c=f_0+f_1$, and the continuous light of the third frequency $f_0+f_1$ is input to The first coupler 51.

The first acousto-optic modulator 14 and the second acousto-optic modulator 15 are respectively electrically connected to the controller 20, and the controller 20 controls specific values of the up-shift frequency $f_c+f_1$ and the downshift frequency $f_c$.

Preferably, the frequency range is from 40 MHz to 200 MHz, and the first frequency difference signal $f_1$ range is from 10 KHz to 100 MHz.

Further, pulsed light of a first frequency $f_0$ is outputted through the three-port optical circulator 40 to the measured medium 80 and returns from the original path after generating backward scattered light of still frequency $f_0$. The backward scattered light is output to the first coupler 51 via the third port 43 of the three-port optical circulator 40. The first coupler 51 is a 2*2 coupler, the first coupler 51 mix the backward scattered light of still frequency $f_0$ from the three-port optical circulator 40 and The continuous light of the second frequency $f_0+f_1$ from the second acousto-optic modulator 15 and output from the two output ports to the two input ports of the balance detector 53. The balance detector 53 processes the continuous light and the pulsed light and outputs the second frequency difference signals V=cos(2πf$_1$t+Δϕ(z)) of the two light to the first analog multiplier 54 and the second analog multiplier 55, respectively.

Wherein, the first frequency signal f$_1$ is the frequency difference of the pulsed light of the first frequency f$_0$ and the pulsed light of the first frequency f$_0$ after being frequency-shifted via the first acousto-optic modulator 14 and the second acousto-optic modulator 15, the t is the time of operation of the phase analog coherent demodulation system for phase sensitive optical time domain reflectometry.

ΔØ(z)=Ø$_0$+Ø$_s$(z)−Ø$_{0frequency-shift}$, the Ø$_0$ is the initial phase of the continuous light of the frequency f$_0$, the Ø$_{0frequency-shift}$ is the phase after the frequency shift of the continuous light, and the Ø$_s$(z) is the phase of the backward Rayleigh scattered light at different positions of the measured medium 80.

The controller 20 divides the continuous light and the first frequency difference signal f$_1$ of the pulsed light into two channels and inputs to the 90° phase shifter 52 and the second analog multiplier 55, respectively.

The 90° phase shifter 52 receives the first frequency difference signal f$_1$ and applies a 90° phase shift to the first analog multiplier 54. The first analog multiplier 54 multiplies the second frequency difference signal and the first frequency difference signal after phase shift by 90° to obtain V$_1$=cos(2πΔft+Δϕ(z))×cos(2πΔft), and the Δf is f$_1$.

The first analog multiplier 54 outputs the operation result to the first low pass filter 56, and the first low pass filter 56 processes the operation result to output a first low frequency signal V$_1$=½×cos(Δϕ(z)).

The second analog multiplier 55 directly receives the first frequency difference signal f$_1$ as a baseband signal and multiplies the first frequency difference signal and the second frequency difference signal to obtain V$_2$=cos(2πΔft+Δϕ(z))×sin(2πΔft), where Δf is f$_1$. The second analog multiplier 55 outputs the operation result to the second low pass filter 57, and the second low pass filter 57 processes the operation result to output a second low frequency signal V$_Q$=−½×sin(Δϕ(z)).

The data collection and processing module 58 is electrically connected to the controller 20, and the data acquisition processing module 58 receives the first low frequency signal and the second low frequency signal and performs division and arctangent operations according to the trigger of the controller 20, obtaining $$\Delta\varnothing(z) = \varnothing_0 + \varnothing_S(z) - \varnothing_{0\ frequency\ shift} = arctg\left(-\frac{V_1}{V_Q}\right),$$

thereby detecting phase information and amplitude information of the backward scattered light.

The initial phase ϕ$_0$ of the continuous light emitted by the laser 11 and the phase ϕ$_{0frequency\ shift}$ after the frequency shift are stable in a short time, so the amount of change Δϕ(z) in the phase difference detected in a short time can be regarded as the amount of change ϕ$_s$(z), that is, the amount of change caused by the vibration signal of the measured medium 80, so that the phase change of the backward scattered light can be detected.

The difference frequency and pulse generator 10 shifts the optical signal emitted by the laser 11 by a frequency Δf, and Δf=f$_1$, offset by the controller 20 in a relatively low frequency range that is easily handled by a circuit, preferably at range of 10 KHz~100 MHz. Therefore, the base frequency of the orthogonal demodulation by the I/Q demodulation module 50 is also 10 KHz~100 MHz. Compared to the prior art, the fundamental frequency of conventional I/Q quadrature demodulation is determined by the shift frequency f$_c$ or f$_c$+f$_1$ of a single acousto-optic modulator (AOM), and the frequency f$_c$ is usually around 40 MHz to 200 MHz. Moreover, the conventional I/Q quadrature demodulation requires a high frequency mixer of several tens of MHz to several hundred MHz, and the design of the high frequency mixer requires a complicated and high precision process guarantee, which is difficult to implement. Therefore, the conventional I/Q quadrature demodulation uses high-speed data acquisition, and uses software operation to realize microwave mixing and low-pass filtering. The phase analog coherent demodulation system for phase sensitive optical time domain reflectometry provided by the invention only needs to use an analog multiplier with a bandwidth of about 10 kHz to 100 MHz for mixing, and can implement mixing frequency and low-pass filtering of I/Q orthogonal demodulation by using a common analog circuit, which solve the need for high-speed data acquisition, reduce the hardware and software requirements of I/Q quadrature demodulation, and thus reduce the difficulty of I/Q quadrature demodulation.

In addition, the traditional optical pulse modulation uses the acousto-optic modulator (AOM), although the light extinction ratio of the AOM is very high, the frequency shift problem brought by itself makes the subsequent IQ quadrature demodulation more difficult, and the AOM itself cannot output very narrow ns-level light pulse, limiting the spatial resolution of the system. The difference frequency and pulse generator 10 of the preferred embodiment replaces the commonly used acousto-optic modulator (AOM) with an electro-optic modulator (EOM) having an light extinction ratio of 40 dB or more, which can realize ns-level narrow pulse modulation, increase the space resolution of the system, and the electro-optical modulator itself does not produce a frequency shifting effect.

Figure 2:
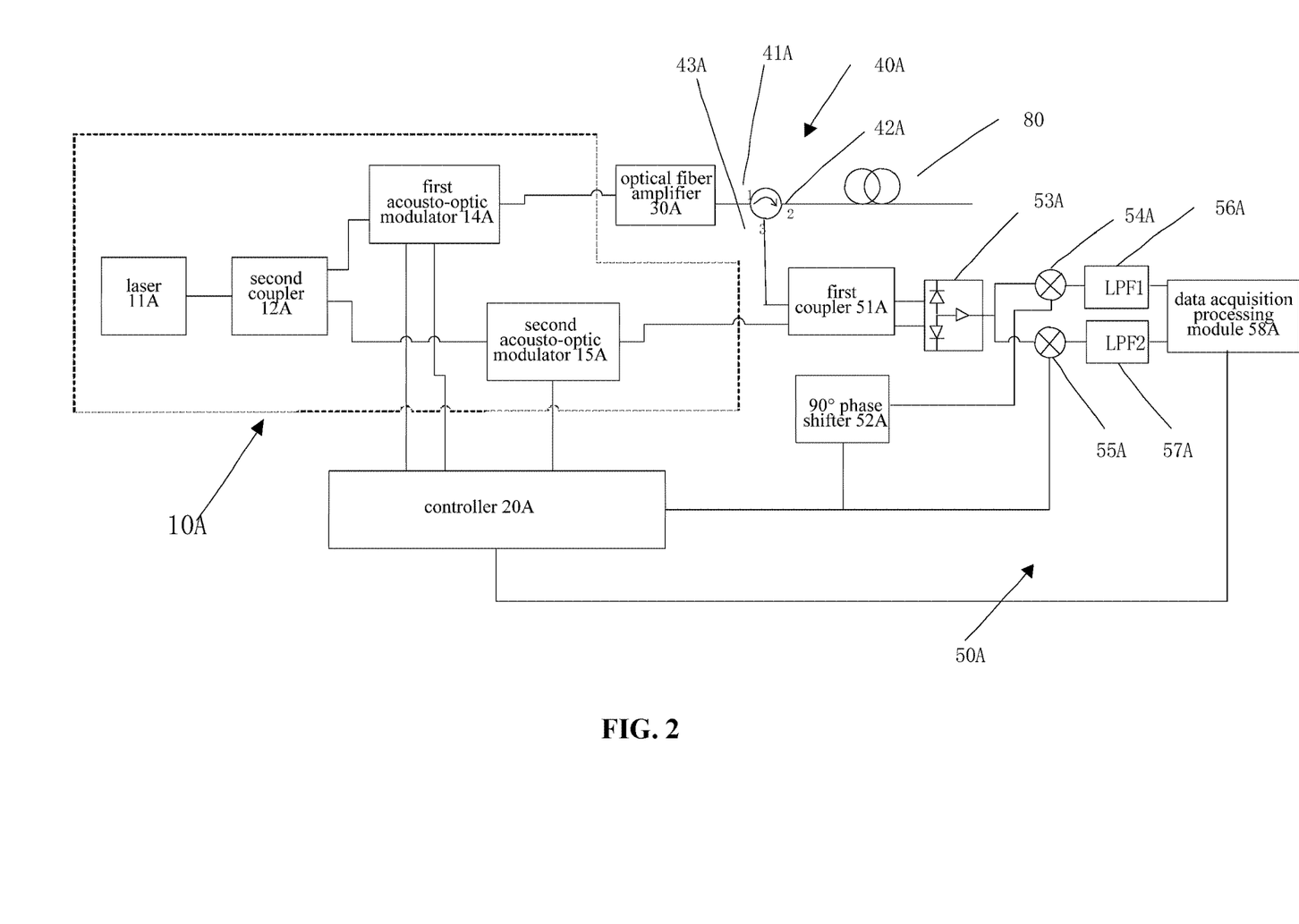
FIG. 2 illustrates a configuration diagram in accordance with another embodiment.

Referring to FIG. 2 of the accompanying drawings, a phase analog coherent demodulation system for phase sensitive optical time domain reflectometry in accordance with another preferred embodiment of the disclosure will be elucidated in the following description. The phase analog coherent demodulation system for phase sensitive optical time domain reflectometry comprises a difference frequency and pulse generator 10A, a controller 20A, an optical fiber amplifier 30A, a three-port optical circulator 40A and an I/Q demodulation module 50A.

The difference frequency and pulse generator 10A is configured to generate two different pulses of pulsed light and continuous light.

The controller 20A is electrically connected to the difference frequency and pulse generator 10A, and the controller 20A generates the first frequency difference signal between the pulsed light and the continuous light.

The optical fiber amplifier 30A is configured to receive the pulsed light and amplifies the optical frequency of the pulsed light. The optical fiber amplifier 30A further transmit the amplified pulsed light into the first port 41A of the three-port optical circulator 40A, and then amplified pulsed light is transmitted to the measured medium 80A through a second port 42A of the three-port optical circulator 40A. A backward scattered light with a similar frequency with the pulse light is generated when the pulse light disseminates in the measured medium 80A. The backward scattered light returns to the three-port optical circulator 40A along the original path and output through a third port 43 of the three-port optical circulator 40A.

The I/Q demodulation module 50A includes a first coupler 51A, a 90° phase shifter 52A, a balance detector 53A, a first analog multiplier 54A, and a second analog multiplier 55A, A first low pass filter 56A, a second low pass filter 57A, and a data acquisition processing module 58A, wherein the continuous light and the backward scattered light are input to the first coupler 51A.

The first coupler 51A mixes the continuous light and the backward scattered light and inputs it into the balance detector 53A. The balance detector 53A processes the continuous light and the backward scattered light and outputs a second frequency difference signal of the two optical signals to the first analog multiplier 54A and the second analog multiplier 55A. The 90° phase shifter 52A receives the first frequency difference signal output from the controller 20A and inputs it into the first analog multiplier 54A after phase shifting by 90°, the first analog multiplier 54A multiplying the second frequency difference signal and the first frequency difference signal after 90° phase shifting, and outputting the operation result to the first low pass filter 56A. The first low pass filter 56A processes the operation result and outputs the first low frequency signal. The second analog multiplier 55A directly receives the first frequency difference signal output from the controller 20A and multiplies the first frequency difference signal and the second difference electrical signal and outputs the operation result to the second Low pass filter 57A. The second low pass filter 57A processes the operation result and outputs a second low frequency signal.

The data acquisition and processing module 58A is electrically connected to the controller 20A, and the data acquisition processing module 58A receives the first low frequency signal and the second low frequency signal and performs division according to the trigger of the controller 20A, thereby detect phase information and amplitude information of the backward scattered light.

Different from the above first preferred embodiment, the difference frequency and pulse generator 10A includes a laser 11A, a second coupler 12A, a first acousto-optic modulator 14A, and a second acousto-optic modulator 15A, wherein the first acousto-optic modulator 14A and the second acousto-optic modulator 15A are electrically connected to the controller 20A, respectively. The laser 11A emits continuous light of a first frequency $f_0$ to the second coupler 12A. The second coupler 12A divides the continuous light into two paths, one of which is input to the first acousto-optic modulator 14A, and the first acousto-optic modulator 14A is driven by the controller 20A. The frequency of the continuous light is shifted up to a second frequency $f_0+f_c+f_1$ and modulated into pulsed light input to the fiber amplifier 30A. The other path is input to the second acousto-optic modulator 15A, the second acousto-optic modulator 15A shifts the frequency of the continuous light up to a third frequency $f_0+f_c$ the continuous light of the third frequency $f_0+f_c$ being input to the first coupling 51A.

The controller 20A controls specific values of the upshift frequency $f_c+f_1$ and the downshift frequency $f_c$.

Preferably, the frequency range is from 40 MHz to 200 MHz, and the first frequency $f_1$ range is from 40 KHz to 200 MHz.

Further, pulsed light of a second frequency $f_0+f_c+f_1$ is outputted through the three-port optical circulator 40A to the measured medium 80 and returns from the original path after generating backward scattered light of still second frequency $f_0+f_c+f_1$. The backward scattered light is output to the first coupler 51A via the third port 43A of the three-port optical circulator 40A. The first coupler 51A is a 2*2 coupler, the first coupler 51A mix the backward scattered light of still second frequency $f_0+f_c+f_1$ from the three-port optical circulator 40A and The continuous light of the third frequency $f_0+f_c$ from the second acousto-optic modulator 15A and output from the two output ports to the two input ports of the balance detector 53A. The balance detector 53A processes the continuous light and the pulsed light and outputs the second frequency difference signals $V=\cos(2\pi f_1 t+\Delta\phi(z))$ of the two light to the first analog multiplier 54A and the second analog multiplier 55A, respectively.

The first frequency $f_1$ is frequency difference between the continuous light having the third frequency $f_0+f_c$ after being frequency-shifted by the second acousto-optic modulator 15A and the pulsed light having the second frequency $f_0+f_c+f_1$ after being frequency-shifted by the first acousto-optic modulator 14A, t is the time during which the phase analog coherent demodulation system for phase sensitive optical time domain reflectometry operates.

$\Delta\emptyset(z)=\emptyset_0+\emptyset_s(z)-\emptyset_{0\,frequency\text{-}shift}$, the $\emptyset_0$ is the initial phase of the continuous light of the first frequency $f_0$, the $\emptyset_{0\,frequency\text{-}shift}$ is the phase after the frequency shift of the continuous light, and the $\emptyset_s(z)$ is the phase of the backward Rayleigh scattered light at different positions of the measured medium 80.

The controller 20A divides the continuous light and the first frequency difference signal $f_1$ of the pulsed light into two channels and inputs to the 90° phase shifter 52A and the second analog multiplier 55A, respectively.

The 90° phase shifter 52A receives the first frequency difference signal $f_1$ and applies a 90° phase shift to the first analog multiplier 54A. The first analog multiplier 54A multiplies the second frequency difference signal and the first frequency difference signal after phase shift by 90° to obtain $V_1=\cos(2\pi\Delta ft+\Delta\phi(z))\times\cos(2\pi\Delta ft)$, and the $\Delta f$ is $f_1$.

The first analog multiplier 54A outputs the operation result to the first low pass filter 56A, and the first low pass filter 56A processes the operation result to output a first low frequency signal $V_1=\frac{1}{2}\times\cos(\Delta\phi(z))$.

The second analog multiplier 55A directly receives the first frequency difference signal $f_1$ as a baseband signal and multiplies the frequency difference signal and the difference frequency electrical signal to obtain $V_2=\cos(2\pi\Delta ft+\Delta\phi(z))\times\sin(2\pi\Delta ft)$, where is the first frequency difference signal $f_1$. The second analog multiplier 55A outputs the operation result to the second low pass filter 57A, and the second low pass filter 57A processes the operation result to output a second low frequency signal $V_Q=-\frac{1}{2}\times\sin(\Delta\phi(z))$.

The data collection and processing module 58A is electrically connected to the controller 20A, and the data acquisition processing module 58A receives the first low frequency signal and the second low frequency signal and performs division and arctangent operations according to the trigger of the controller 20A, obtaining $$\Delta\emptyset(z)=\emptyset_0+\emptyset_S(z)-\emptyset_{0\,frequency\,shift}=arctg\left(-\frac{V_1}{V_Q}\right),$$

thereby detecting phase information and amplitude information of the backward scattered light.

The initial phase $\phi_0$ of the continuous light emitted by the laser 11A and the phase $\emptyset_0$ frequency shift after the frequency shift are stable in a short time, so the amount of change $\Delta\phi(z)$ in the phase difference detected in a short time can be regarded as the amount of change $\phi_s(z)$, that is, the amount of change caused by the vibration signal of the measured medium 80, so that the phase change of the backward scattered light can be detected.

It is worth mentioning that the first acousto-optic modulator 14A in the preferred embodiment both achieves frequency shifting of the continuous light and modulates the continuous light into pulsed light, although not capable to produce very narrow pulsed light like an electro-optic modulation, but it simplifies the structure in design, saves cost, and is suitable for occasions where space resolution is not high.

Figure 3:
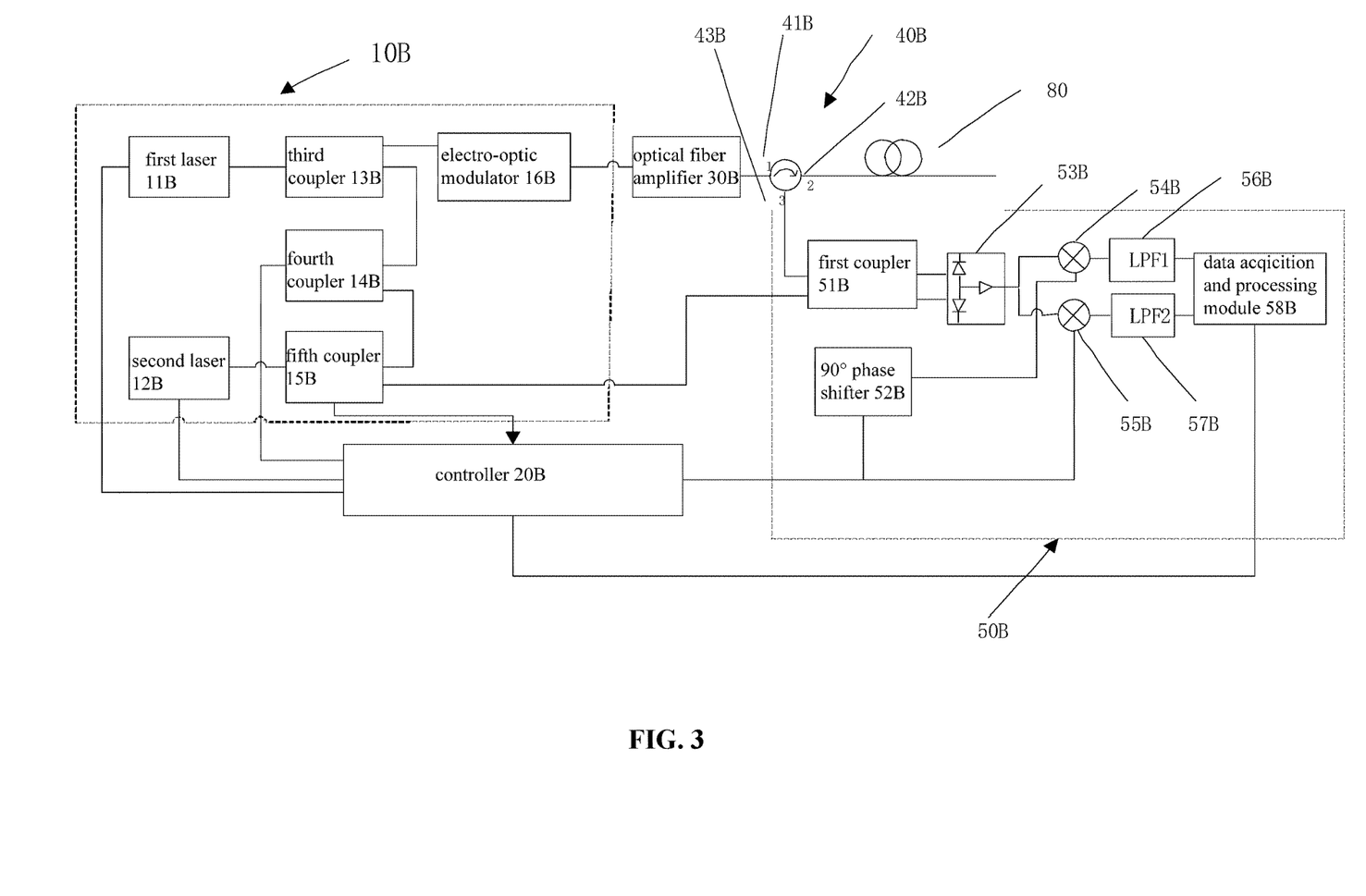
FIG. 3 illustrates a configuration diagram in accordance with another embodiment.

Referring to FIG. 3 of the accompanying drawings, a phase analog coherent demodulation system for phase sensitive optical time domain reflectometry in accordance with another preferred embodiment of the disclosure will be illustrated in the following description. The phase analog coherent demodulation system for phase sensitive optical time domain reflectometry comprises, a difference frequency and pulse generator 10B, a controller 20B, an optical fiber amplifier 30B, a three-port optical circulator 40B, and an I/Q demodulation module 50B.

The difference frequency and pulse generator 10B is configured to generate two different pulses of pulsed light and continuous light.

the controller 20B is electrically connected to the difference frequency and pulse generator 10B, and the controller 20B generates the first frequency difference signal between the pulsed light and the continuous light;

The optical fiber amplifier 30B is configured to receive the pulsed light and amplifies the optical frequency of the pulsed light. The optical fiber amplifier 30B further transmit the amplified pulsed light into the first port 41B of the three-port optical circulator 40B, and then amplified pulsed light is transmitted to the measured medium 80B through a second port 42B of the three-port optical circulator 40B. A backward scattered light with a similar frequency with the pulse light is generated when the pulse light disseminates in the measured medium 80B. The backward scattered light returns to the three-port optical circulator 40B along the original path and output through a third port 43B of the three-port optical circulator 40B.

The I/Q demodulation module 50B includes a first coupler 51B, a 90° phase shifter 52B, a balance detector 53B, a first analog multiplier 54B, and a second analog multiplier 55B, A first low pass filter 56B, a second low pass filter 57B, and a data acquisition processing module 58B, wherein the continuous light and the backward scattered light are input to the first coupler 51B.

The first coupler 51B mixes the continuous light and the backward scattered light and inputs it into the balance detector 53B. The balance detector 53B processes the continuous light and the backward scattered light and outputs a second frequency difference signal of the two optical signals to the first analog multiplier 54 B and the second analog multiplier 55B. The 90° phase shifter 52B receives the first frequency difference signal output from the controller 20B and inputs it into the first analog multiplier 54B after phase shifting by 90°, the first analog multiplier 54B multiplying the second frequency difference signal and the first frequency difference signal after 90° phase shifting, and outputting the operation result to the first low pass filter 56B. The first low pass filter 56B processes the operation result and outputs the first low frequency signal. The second analog multiplier 55B directly receives the first frequency difference signal output from the controller 20B and multiplies the first frequency difference signal and the second frequency difference signal and outputs the operation result to the second Low pass filter 57B. The second low pass filter 57B processes the operation result and outputs a second low frequency signal.

The data acquisition and processing module 58B is electrically connected to the controller 20B, and the data acquisition processing module 58B receives the first low frequency signal and the second low frequency signal and performs division according to the trigger of the controller 20B, thereby detect phase information and amplitude information of the backward scattered light.

Different from the above two embodiments, the difference frequency and pulse generator 10B includes a first laser 11B, a second laser 12B, a third coupler 13B, a fourth coupler 14B, a fifth coupler 15B, and an electro-optical modulator 16B. The first laser 11B emits continuous light of a first frequency $f_1$ to the third coupler 13B, and is divided into two paths by the third coupler 13B. One path is modulated into pulsed light by the electro-optic modulator 16B and output to the optical fiber amplifier 30B, and another continuous light output from the third coupler 13B is input to the fourth coupler 14B. The second laser 12B emits continuous light of a second frequency $f_2$ to the fifth coupler 15B, and is divided into two paths by the fifth coupler 15B. One way is input to the fourth coupler 14B. The fourth coupler 14B mixes the continuous light having the first frequency $f_1$ from the third coupler 13B with the continuous light having the second frequency $f_2$ from the fifth coupler 15B, and inputs it into the controller 20B.

The continuous light of another second frequency $f_2$ output by the fifth coupler 15B is input to the first coupler 51B of the I/Q demodulation module 50B. The first laser 11B and the second laser 12B are respectively communicably connected to the controller 20B, and the controller 20B is configured to detect and output the first frequency difference signal $\Delta f = f_1 - f_2$ of the continuous light emitted by the first laser 11B and the second laser 12B, respectively. The controller 20B is capable of locking the first frequency difference signal $\Delta f$ within a certain range by controlling the current and temperature of the first laser 11B and the second laser 12B. The controller 20B outputs two first frequency difference signals as the fundamental frequency signals of the analog multiplication, one of which is directly input to the second analog multiplier 55B, and the other of which is processed by the 90° phase shifter 52B and then input to the first analog multiplier 54B.

Specifically, pulsed light of a first frequency $f_1$ is outputted through the three-port optical circulator 40B to the measured medium 80 and returns from the original path after generating backward scattered light of still first frequency $f_1$. The backward scattered light is output via the third port 43B of the three-port optical circulator 40B. The first coupler 51B is a 2*2 coupler, the first coupler 51B mix the backward scattered light of still first frequency $f_1$ from the three-port optical circulator 40B and The continuous light of the second frequency $f_2$ from the fifth coupler 15B and output from the two output ports to the two input ports of the balance detector 53B.

The balance detector 53B processes the continuous light and the pulsed light and outputs the second frequency difference signals $V = \cos(2\pi \Delta f t + \Delta \phi(z))$ of the two light to the first analog multiplier 54B and the second analog multiplier 55B, respectively.

Wherein, the $\Delta f = f_1 - f_2$ is the frequency difference of the continuous light emitted by the first laser 11B and the second laser 12B, the t is the time of operation of the phase analog coherent demodulation system for phase sensitive optical time domain reflectometry.

$\Delta\phi(z)=\phi_{\lambda 1}-\phi_{\lambda 1}(z)-\phi_{\lambda 2}$, the $\phi_{\lambda 1}$ is the initial phase of the continuous light emitted by the first laser 11B, the $\phi_{\lambda 2}$ is the initial phase of the continuous light emitted by the second laser 12B, and the $\phi_{\lambda 1}(z)$ is the phase of the backward Rayleigh scattered light at different positions of the measured medium 80.

The 90° phase shifter 52B receives the first frequency difference signal $\Delta f$ and applies a 90° phase shift to the first analog multiplier 54B. The first analog multiplier 54B multiplies the second frequency difference signal and the first frequency difference signal after phase shift by 90° to obtain $V_1=\cos(2\pi\Delta ft+\Delta\phi(z))\times\cos(2\pi\Delta ft)$, and the $\Delta f$ is $\Delta f=f_1-f_2$. The first analog multiplier 54B outputs the operation result to the first low pass filter 56B, and the first low pass filter 56B processes the operation result to output the first low frequency signal $V_1=\frac{1}{2}\times\cos(\Delta\phi(z))$.

The second analog multiplier 55B directly receives the first frequency difference signal $\Delta f$ as a baseband signal and multiplies the first frequency difference signal and the difference frequency electrical signal to obtain $V_2=\cos(2\pi\Delta ft+\Delta\phi(z))\times\sin(2\pi\Delta ft)$, where $\Delta f=f_1-f_2$. The second analog multiplier 55B outputs the operation result to the second low pass filter 57B, and the second low pass filter 57B processes the operation result to output a second low frequency signal $V_Q=-\frac{1}{2}\times\sin(\Delta\phi(z))$.

The data collection and processing module 58B is electrically connected to the controller 20B, and the data acquisition processing module 58B receives the first low frequency signal and the second low frequency signal and performs division and arctangent operations according to the trigger of the controller 20B, obtaining $$\Delta\phi(z) = \phi_{\lambda 1} - \phi_{\lambda 1}(z) - \phi_{\lambda 2} = arctg\left(-\frac{V_1}{V_Q}\right),$$

thereby detecting phase information and amplitude information of the backward scattered light.

The initial phase $\phi_{\lambda 1}$ and $\phi_{\lambda 2}$ of the continuous light emitted respectively by the first laser 11B and the second laser 12B are stable in a short time, so the amount of change $\Delta\phi(z)$ in the phase difference detected in a short time can be regarded as the amount of change $\phi_{\lambda 1}(z)$, that is, the amount of change caused by the vibration signal of the measured medium 80, so that the phase change of the backward scattered light can be detected.

The first difference frequency signal $\Delta f=f_1-f_2$ of the continuous light emitted respectively by the first laser 11B and the second laser 12B offset by the controller 20B in a relatively low frequency range that is easily handled by a circuit, preferably at range of 10 KHz~100 MHz. Therefore, the base frequency of the orthogonal demodulation by the I/Q demodulation module 50B is also 10 KHz~100 MHz. Compared to the prior art, the fundamental frequency of conventional I/Q quadrature demodulation is determined by the shift frequency of a single acousto-optic modulator (AOM). Moreover, the conventional I/Q quadrature demodulation requires a high frequency mixer of several tens of MHz to Hundreds of MHz, and the design of the high frequency mixer requires a complicated and high precision process guarantee, which is difficult to implement. Therefore, the conventional I/Q quadrature demodulation uses high-speed data acquisition, and uses software operation to realize microwave mixing and low-pass filtering. The phase analog coherent demodulation system for phase sensitive optical time domain reflectometry provided by the invention only needs to use an analog multiplier with a bandwidth of about 10 kHz to 100 MHz for mixing, and can implement mixing frequency and low-pass filtering of I/Q orthogonal demodulation by using a common analog circuit, which solve the need for high-speed data acquisition, reduce the hardware and software requirements of I/Q quadrature demodulation, and thus reduce the difficulty of I/Q quadrature demodulation.

In addition, the traditional optical pulse modulation uses the acousto-optic modulator (AOM), although the light extinction ratio of the AOM is very high, the frequency shift problem brought by itself makes the subsequent IQ quadrature demodulation more difficult, and the AOM itself cannot output very narrow ns-level light pulse, limiting the spatial resolution of the system. The difference frequency and pulse generator 10B of the preferred embodiment replaces the commonly used acousto-optic modulator (AOM) with an electro-optic modulator (EOM) having an light extinction ratio of 40 dB or more, which can realize ns-level narrow pulse modulation, increase the space resolution of the system, and the electro-optical modulator itself does not produce a frequency shifting effect.

It will be easily understood by those skilled in the art that in the above three preferred embodiments, the measured medium 80 may be, but not limited to, an optical fiber, an atmosphere, or the like.

It is worth mentioning that the phase analog coherent demodulation system for phase sensitive optical time domain reflectometry further includes a laser transceiver 70 (not shown) when the measured medium 80 is atmospheric. Taking the first preferred embodiment as an example, the laser transceiver 70 is connected to the second port 42 of the three-port optical circulator 40. The laser transceiver 70 collimates the pulsed light output from the three-port optical circulator 40 and inputs it into the atmosphere. When the pulsed light propagates in the atmosphere, it acts on the particles in the atmosphere to generate a frequency-invariant backward scattered light. The backward scattered light is received by the laser transceiver 70 along the original path and output to the I/Q demodulation module 50 through the third port 43 of the three-port optical circulator 40 for quadrature demodulation.

It will be easily understood by those skilled in the art that in the second preferred embodiment, the laser transceiver 70 is connected to the second port 42A of the three-port circulator 40A; in the third preferred embodiment, the laser transceiver 70 is connected to the second port 42B of the three-port circulator 40B.

Figure 4:
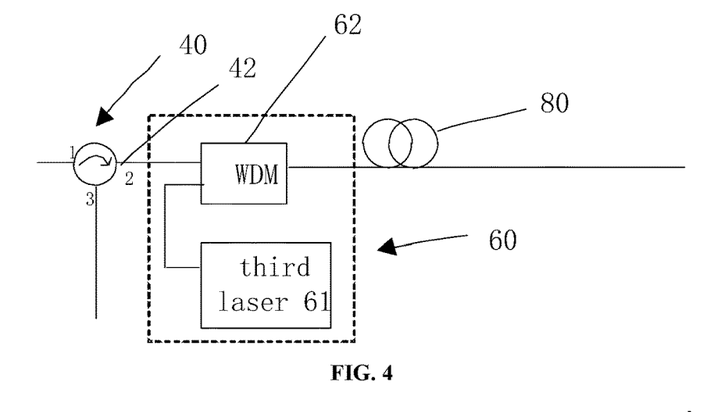
FIG. 4 illustrates a configuration diagram in accordance with Raman amplification module embodiment.

Referring to FIG. 4 of the accompanying drawings, in order to increase the measured distance of the system, the above three preferred embodiments further include a Raman amplification module 60. Taking the first preferred embodiment as an example, the Raman amplification module 60 is disposed between the three-port optical circulator 40 and the measured medium 80. The Raman amplification module 60 includes a third laser 61 and a wavelength division multiplexing module 62, and the third laser 61 is connected to the wavelength division multiplexing module 62. The wavelength division multiplexing module 62 is connected to the second port 42 of the three-port optical circulator 40, and the pulse light output from the three-port optical circulator 40 is input to the wavelength division multiplexing module 62. The third laser 61 outputs continuous light of a frequency $f_3$ to the wavelength division multiplexing module 62. The wavelength division multiplexing module 62 combines the pulsed light output from the three-port optical circulator 40 with the continuous light from the third laser 61 into the measured medium 80 to form a distributed Raman amplification structure. In the measured medium 80, energy is transferred from the continuous light emitted from the third laser 61 to the pulse light outputted by the three-port optical circulator 40, and the pulse light output from the three-port optical circulator 40 is amplified, which is conducive to long-distance measurement and increase the measurement distance of the system.

It will be easily understood by those skilled in the art that in the second preferred embodiment, the Raman amplification module 60 is disposed between the three-port circulator 40A and the measured medium 80; in the third preferred embodiment The Raman amplification module 60 is disposed between the three-port circulator 40B and the measured medium 80.

Figure 5:
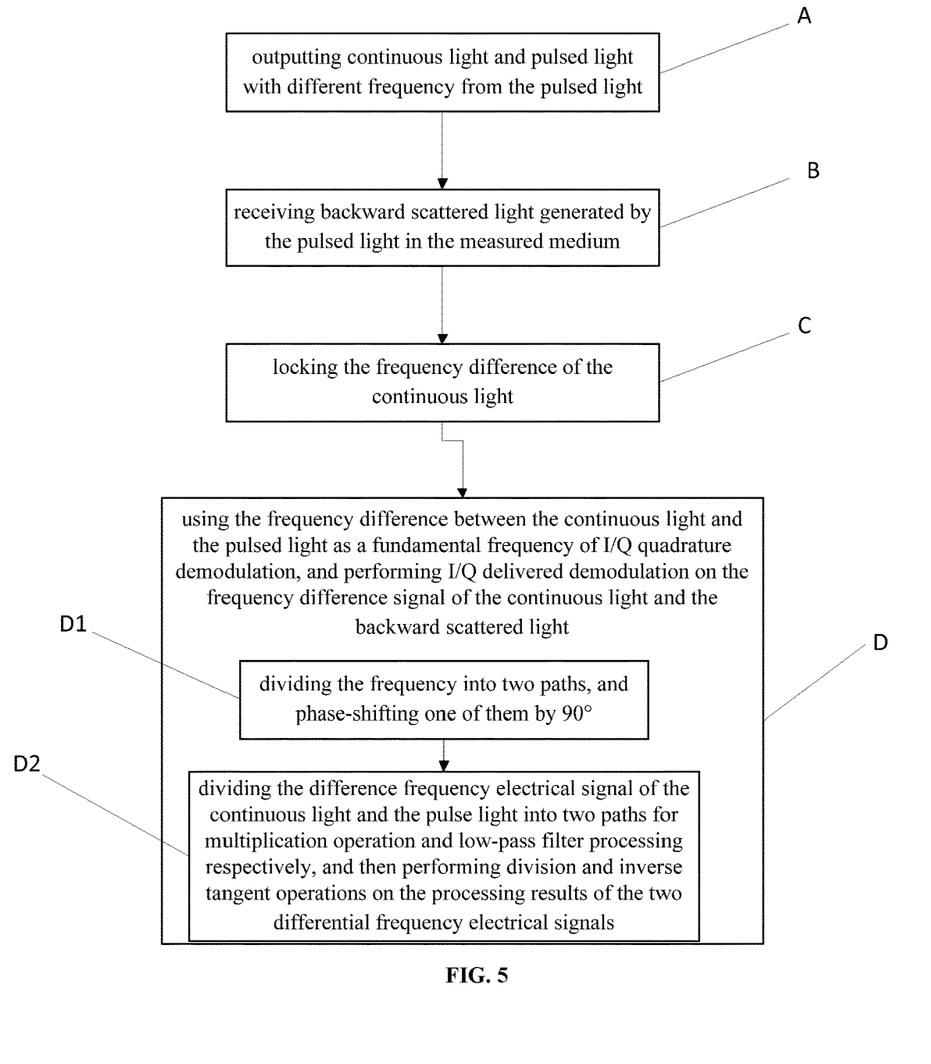
FIG. 5 illustrates a process diagram in accordance with a embodiment.

As shown in FIG. 5, the disclosure further provides a Phase sensitive optical time domain reflectometry phase analog coherent demodulation method, which includes the following steps:

(A) outputting continuous light and pulsed light of different frequencies;

(B) receiving backward scattered light generated by the pulsed light in the measured medium;

(C) locking the frequency difference of the continuous light and the pulsed light of 10 kHz to 100 MHz;

(D) using the frequency difference between the continuous light and the pulsed light as a fundamental frequency of I/Q quadrature demodulation, and performing I/Q delivered demodulation on the difference frequency electrical signals of the continuous light and the backward scattered light.

Specifically, in the step (D), the method includes:

In step (D1), dividing the frequency into two paths, and phase-shifting one of them by 90°.

Further, in the step (D), the method includes:

Step (D2) dividing the difference frequency electrical signal of the continuous light and the pulse light into two paths for multiplication operation and low-pass filter processing respectively, and then performing division and inverse tangent operations on the processing results of the two differential frequency electrical signals.

The above-mentioned embodiments merely present several embodiments of the invention, which are described in detail, but should not be interpreted as limiting the scope of the invention. It should be noted that those skilled in the art may make various modifications and improvements without departing from the concept of the invention, all of which fall within the protection scope of the invention. Therefore, the protection scope of the present patent shall be subject to the appended claims.

What is claimed is:

1. A phase analog coherent demodulation system for phase sensitive optical time domain reflectometry, comprising:
    a difference frequency and pulse generator, configured to generate a pulsed light and a continuous light with a different frequency from the pulsed light;
    a controller, configured to be electrically connected to the difference frequency and pulse generator, and the controller further being configured to generate a first frequency difference signal with a frequency of range of 10 KHz-100 MHz between the pulsed light and the continuous light;
    an optical fiber amplifier configured to receive the pulsed light and amplify the optical frequency of the pulsed light;
    a three-port optical circulator with a first port, a second port, and a third port, and the three-port circulator being configured to receive the amplified pulsed light from the optical fiber amplifier through the first port and transmit the amplified pulsed light to a measured medium through the second port, a backward scattered light with a similar frequency with the amplified pulse light being generated when the pulse light disseminates in the measured medium, the backward scattered light being returned to the three-port optical circulator along the original path and output through the third port; and
    an I/Q demodulation module configured to receive the backward scattered light, the continuous light, and the first frequency difference signal, the I/Q demodulation module being further configured to mix the backward scattered light and the continuous light to generate a second frequency difference signal of the backward scattered light and the continuous light, and orthogonally demodulate the second frequency difference signal with the first frequency difference signal as a quadrature demodulated baseband signal to obtain phase information and amplitude information of the second frequency signal;
    wherein the I/Q demodulation module comprises a first coupler, a 90° phase shifter, a balance detector, a first analog multiplier, and a second analog multiplier, a first low pass filter, a second low pass filter, and a data acquisition processing module, wherein the first coupler receives and mixes the continuous light and the backward scattered light and inputs the continuous light and the backward scattered light mixed to the balance detector, the balance detector processes the continuous light and the backward scattered light mixed and generate the second frequency difference signal, the 90° phase shifter receives the first frequency difference signal and inputs it into the first analog multiplier after phase shifting by 90°, the first analog multiplier multiples the second frequency difference signal and the first frequency difference signal after 90° phase shifting, and outputs the operation result to the first low pass filter, the first low pass filter processes the operation result and outputs the first low frequency signal, the second analog multiplier directly receives the first frequency difference signal and multiples the first frequency difference signal and the second frequency difference signal and outputs the operation result to the second low pass filter, the second low pass filter processes the operation result and outputs a second low frequency signal, the data acquisition and processing module is electrically connected to the controller, and the data acquisition processing module receives the first low frequency signal and the second low frequency signal under control by the controller and performs divisions and anti tangent operations to obtain the phase information and the amplitude information based on the first low frequency signal and the second low frequency signal.

2. The phase analog coherent demodulation system for phase sensitive optical time domain reflectometry of claim 1, wherein the difference frequency and pulse generator includes a laser, a second coupler, an electro-optic modulator, a first acousto-optic modulator, and a second acousto-optic modulator, the electro-optic modulator, the first acousto-optic modulator and the second acousto-optic modulator are respectively electrically connected to the controller, the laser emits continuous light of a first frequency to the second coupler, the second coupler divides the continuous light into two beams, one of which is input to the electro-optic modulator, and the electro-optic modulator modulates the continuous light into pulses under the driving of the controller and input it to the fiber amplifier, the other way is sequentially input to the first acousto-optic modulator and the second acousto-optic modulator, the first acousto-optic modulator shifts the frequency of the continuous light up to a second frequency, the second acousto-optic modulator shifts the frequency of the continuous light downward to a third frequency input to the first coupler, the controller outputs a first frequency difference signal to the I/Q demodulation module.

3. The phase analog coherent demodulation system for phase sensitive optical time domain reflectometry of claim 1, wherein the difference frequency and pulse generator includes a laser, a second coupler, a first acousto-optic modulator, and a second acousto-optic modulator, wherein the first acousto-optic modulator and the second acousto-optic modulator are electrically connected to the controller, respectively, the laser emits continuous light of a first frequency to the second coupler, the second coupler divides the continuous light into two beams, one of which is input to the first acousto-optic modulator, and the first acousto-optic modulator is driven by the controller, the frequency of the continuous light is shifted up to a second frequency and modulated into pulsed light input to the fiber amplifier, the other one of which is input to the second acousto-optic modulator, the second acousto-optic modulator shifts the frequency of the continuous light up to a third frequency and input to the first coupler, the controller outputs a first frequency difference signal to the I/Q demodulation module.

4. The phase analog coherent demodulation system for phase sensitive optical time domain reflectometry of claim 1, wherein the difference frequency and pulse generator includes a first laser, a second laser, a third coupler, a fourth coupler, another coupler, and an electro-optical modulator, wherein the first laser emits continuous light of a first frequency to the third coupler, the third coupler divides the continuous into two beams, one of which is modulated into pulsed light by the electro-optic modulator and output to the optical fiber amplifier, and the other one of which output from the third coupler is input to the fourth coupler, the second laser emits continuous light of a second frequency to the another coupler, and the another coupler divide the continuous light into two beams, one beam of the continuous light is input to the fourth coupler, the fourth coupler mixes the continuous light having the first frequency from the third coupler with the continuous light having the second frequency, and inputs it into the controller, the other beam of the continuous light of the second frequency output by the another coupler is input to the first coupler, the first laser and the second laser are respectively electrically connected to the controller, and the controller outputs a first frequency difference signal of continuous lights emitted respectively by the first laser and the second laser to the I/Q demodulation module.

5. The phase analog coherent demodulation system for phase sensitive optical time domain reflectometry of claim 1, wherein the measured medium is optical fiber or atmosphere.

6. The phase analog coherent demodulation system for phase sensitive optical time domain reflectometry of claim 1, wherein the phase analog coherent demodulation system for phase sensitive optical time domain reflectometry further include a Raman amplification module, the Raman amplification module is disposed between the three-port optical circulator and the measured medium, the Raman amplification module includes a laser and a wavelength division multiplexing module, and the laser output continuous light having a second frequency to the wavelength division multiplexing module, the wavelength division multiplexing module is connected to the second port of the three-port optical circulator.

7. A phase analog coherent demodulation method for phase sensitive optical time domain reflectometry, which comprises:
    outputting a continuous light and a pulsed light with different frequency from the pulsed light generated from a difference frequency and pulse generator;
    receiving backward scattered light generated by the pulsed light in a measured medium;
    locking the frequency difference of the continuous light;
    using the frequency difference between the continuous light and the pulsed light as a fundamental frequency of I/Q quadrature demodulation, and performing I/Q delivered demodulation on the frequency difference signal of the continuous light and the backward scattered light;
    wherein the difference frequency and pulse generator includes a first laser, a second laser, a second coupler, a third coupler, a fourth coupler, and an electro-optical modulator, wherein the first laser emits continuous light of a first frequency to the second coupler, the second coupler divides the continuous into two beams, one of which is modulated into pulsed light by the electro-optic modulator and output to an optical fiber amplifier, and the other one of which output from the second coupler is input to the third coupler, the second laser emits continuous light of a second frequency to the fourth coupler, and the fourth coupler divide the continuous light into two beams, one beam of the continuous light is input to the third coupler, the third coupler mixes the continuous light having the first frequency from the second coupler with the continuous light having the second frequency, and inputs it into a controller, the other beam of the continuous light of the second frequency output by the fourth coupler is input to a first coupler, the first laser and the second laser are respectively electrically connected to the controller, and the controller outputs a first frequency difference signal of continuous lights emitted respectively by the first laser and the second laser to an I/Q demodulation module.

8. The phase analog coherent demodulation method for phase sensitive optical time domain reflectometry of claim 7, using the frequency difference between the continuous light and the pulsed light as a fundamental frequency of I/Q quadrature demodulation, and performing I/Q delivered demodulation on the frequency difference signals of the continuous light and the backward scattered light comprising:
    dividing the frequency into two paths, and phase-shifting one of them by 90°;
    dividing the frequency difference signal of the continuous light and the pulse light into two paths for multiplication operation and low-pass filter processing respectively, and then performing division and inverse tangent operations on the processing results of the two paths of the frequency difference signals.

9. The phase analog coherent demodulation method for phase sensitive optical time domain reflectometry of claim 7, the range of the frequency difference signal is controlled by the controller at 10 KHz-100 MHz.

10. A phase analog coherent demodulation system for phase sensitive optical time domain reflectometry, comprising:
- a difference frequency and pulse generator, configured to generate a pulsed light and a continuous light with a different frequency from the pulsed light;
- a controller, configured to be electrically connected to the difference frequency and pulse generator, and the controller further being configured to generate a first frequency difference signal with a frequency of range of 10 KHz-100 MHz between the pulsed light and the continuous light;
- an optical fiber amplifier configured to receive the pulsed light and amplify the optical frequency of the pulsed light;
- a three-port optical circulator with a first port, a second port, and a third port, and the three-port circulator being configured to receive the amplified pulsed light from the optical fiber amplifier through the first port and transmit the amplified pulsed light to a measured medium through the second port, a backward scattered light with a similar frequency with the amplified pulse light being generated when the pulse light disseminates in the measured medium, the backward scattered light being returned to the three-port optical circulator along the original path and output through the third port; and
- an I/Q demodulation module configured to receive the backward scattered light, the continuous light, and the first frequency difference signal, the I/Q demodulation module being further configured to mix the backward scattered light and the continuous light to generate a second frequency difference signal of the backward scattered light and the continuous light, and orthogonally demodulate the second frequency difference signal with the first frequency difference signal as a quadrature demodulated baseband signal to obtain phase information and amplitude information of the second frequency signal;
- wherein the phase analog coherent demodulation system for phase sensitive optical time domain reflectometry further include a Raman amplification module, the Raman amplification module is disposed between the three-port optical circulator and the measured medium, the Raman amplification module includes a laser and a wavelength division multiplexing module, and the laser output continuous light having a second frequency to the wavelength division multiplexing module, the wavelength division multiplexing module is connected to the second port of the three-port optical circulator.

\* \* \* \* \*